United States Patent
Goodman et al.

(10) Patent No.: US 6,947,858 B2
(45) Date of Patent: Sep. 20, 2005

(54) METHODS AND APPARATUS FOR ANALYZING FLUTTER TEST DATA USING DAMPED SINE CURVE FITTING

(75) Inventors: Charles E. Goodman, Chesterfield, MO (US); William B. Hayes, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/608,640

(22) Filed: Jun. 27, 2003

(65) Prior Publication Data

US 2004/0267478 A1 Dec. 30, 2004

(51) Int. Cl.[7] .............................................. G01R 13/00
(52) U.S. Cl. .............................. 702/66; 702/56; 702/77
(58) Field of Search ............................... 702/66, 41, 42, 702/56, 75, 76, 77

(56) References Cited

U.S. PATENT DOCUMENTS

| | | | |
|---|---|---|---|
| 5,475,793 A | 12/1995 | Broomhead et al. | |
| 5,610,837 A | * 3/1997 | Murphy | 702/56 |
| 5,640,330 A | 6/1997 | Cooper et al. | |
| 5,819,188 A | 10/1998 | Vos | |
| 6,195,982 B1 | * 3/2001 | Gysling et al. | 60/204 |
| 6,216,063 B1 | 4/2001 | Lind et al. | |
| 6,253,120 B1 | 6/2001 | Shimada et al. | |
| 6,574,570 B1 | * 6/2003 | Sato et al. | 702/41 |
| 6,582,183 B2 | * 6/2003 | Eveker et al. | 415/1 |
| 6,614,613 B1 | * 9/2003 | Huang et al. | 360/75 |
| 2004/0243310 A1 | * 12/2004 | Griffin et al. | 702/10 |

* cited by examiner

*Primary Examiner*—Marc S. Hoff
*Assistant Examiner*—Anthony Gutierrez
(74) *Attorney, Agent, or Firm*—Black Lowe & Graham, PLLC

(57) ABSTRACT

Methods and apparatus for analyzing flutter test data using damped sine curve fitting. In one embodiment, a plurality of data points are read, with each data point representing an amplitude versus a test time. A number "N" of damped sine waves to fit to the plurality of data points is determined, and the number "N" of damped sine waves is fit to the plurality of data points using a non-linear "N" damped sine wave fitting algorithm.

42 Claims, 5 Drawing Sheets

METHODS AND APPARATUS FOR ANALYZING FLUTTER TEST DATA USING DAMPED SINE CURVE FITTING

FIELD OF THE INVENTION

The present invention relates generally to analyzing data and, more specifically, to analyzing flutter test data.

BACKGROUND OF THE INVENTION

In the field of aeroelasticity, the phenomenon known as flutter generally refers to a condition produced by the coalescing and proper phasing of two or more structural vibration modes of a structure, such as an aircraft wing, fuselage, empennage, or other structural component. During flight, the aerodynamic forces over such structures may cause an unstable oscillatory aeroelastic deformation of the structure referred to as flutter. Flutter of an aeroelastic structure may depend on numerous factors, including the mass, stiffness, and shape of the structure, and the particular operating conditions of the structure, including the velocity and density of the airstream.

Flutter of an aircraft wing may involve both bending and torsional types of motion. In some cases, the aeroelastic deformations may be relatively mild and stable within the normal operating envelope of the aircraft. In the case of flutter, however, the aeroelastic deformations are driven into an unstable mode in which the torsional motion extracts energy from the airstream and drives the bending mode to increasingly higher amplitudes, causing oscillations of increasing amplitude that may eventually result in catastrophic failure of the structure.

The avoidance of the unstable condition of flutter and the determination of the maximum allowable flight speed before flutter is encountered are critical priorities for designers of aeroelastic structures and aerospace vehicles. Exhaustive flight and wind tunnel tests are usually conducted to record and observe the flutter characteristics of the various aeroelastic structures of an aircraft over the entire flight envelope of the vehicle , and to predict a safe operating speed envelope. This is typically accomplished by determining the frequency and damping of each important aeroelastic vibration mode, and tracking the changes in these parameters for a variety of Mach number and dynamic pressure flight conditions. For military aircraft combat and surveillance missions, the attachment of multiple external stores to the wing or fuselage further complicates the analysis and increases the extent and complexity of the testing required. Differences in store number, type, and mounting location give rise to complex multi-variable oscillation coupling patterns, and can give an aircraft as many different flutter speeds as there are store configurations.

The reduction of flutter test time history data is difficult for three principal reasons. First, the test data from flutter sensors can contain significant noise which may hamper the analysis. Second, the test data may contain multiple modes, each with different frequency and damping characteristics. And third, because typical flutter testing involves the acquisition of data from many sensors distributed over an aeroelastic structure, the data from different sensors may yield different results. For example, each sensor or transducer may respond in one or more of the aircraft's structural modes (resonance frequencies). For a single transducer, the response is often dominated by one mode. However, the response of other aircraft modes can make it difficult to extract the characteristics of the primary mode. The presence of noise in the data only exacerbates the problem. In the past, several transducers would be processed individually, and results might necessarily be selected from a single transducer. Alternately, averaging among the available data may be performed. These analytical methods tend to rely on the subjective determinations of a test engineer. Although desirable results have been achieved using such analysis methods, the complexity of aeroelastic flutter and continuing advances in aerospace vehicle requirements are placing increasing demands on those who design and analyze flutter test data of aeroelastic structures. Therefore, there is an unmet need in the art for improved methods of analyzing flutter test data that might better characterize the data from a plurality of transducers with reduced subjectivity.

SUMMARY OF THE INVENTION

The present invention is directed to methods and apparatus for analyzing flutter test data using non-linear damped sine curve fitting. Methods in accordance with the present invention may advantageously provide improved characterization of flutter test data, thereby improving the performance and reducing the risk of flutter instability of aeroelastic structures.

In one embodiment, a plurality of data points is read, with each data point representing an amplitude versus a test time. A number "N" of damped sine waves to fit to the plurality of data points is determined, and the number "N" of damped sine waves is fit to the plurality of data points using a non-linear "N" damped sine wave fitting algorithm.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
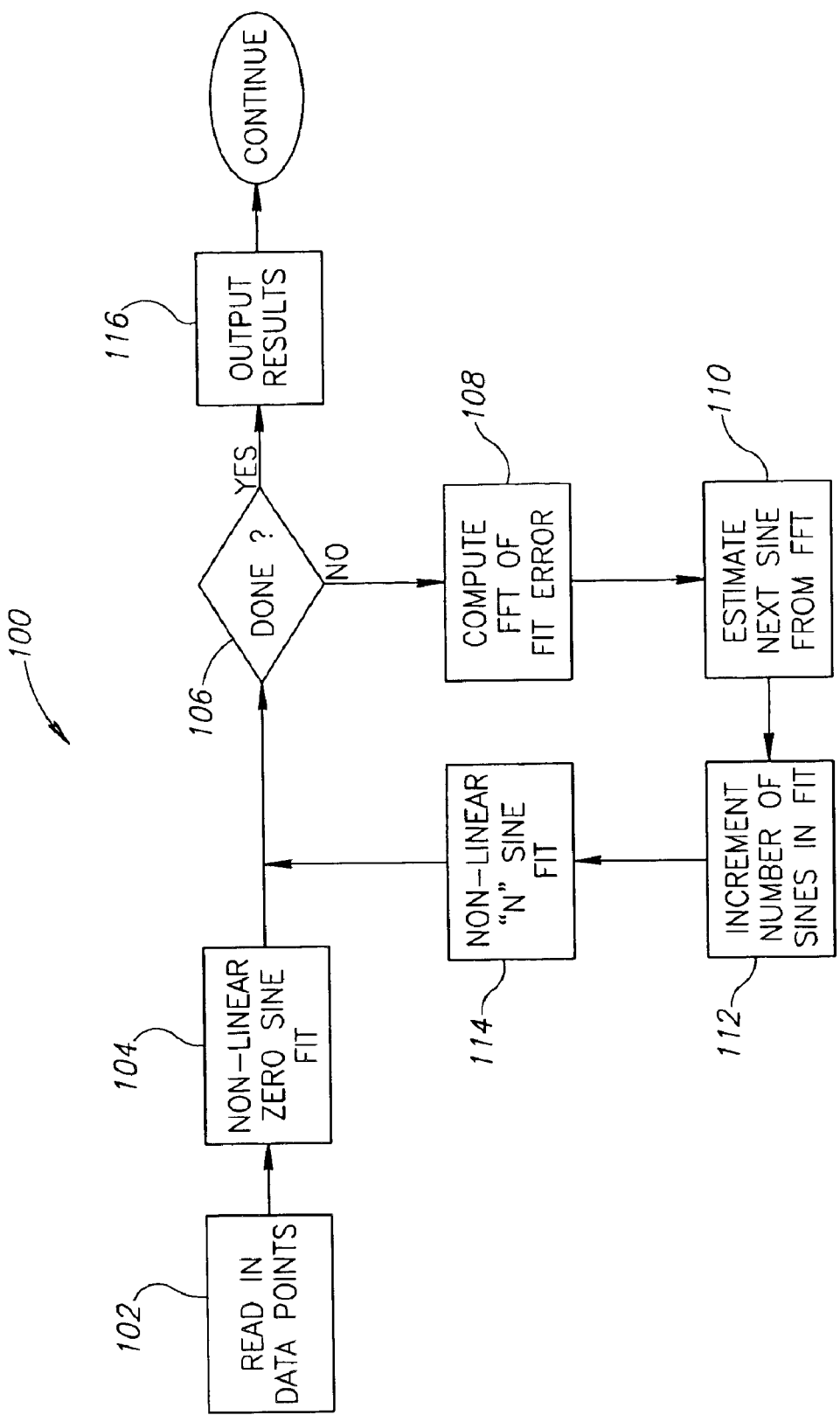
FIG. 1 is a flowchart of a method of analyzing a flutter time history data set according to an embodiment of the present invention.

The present invention relates to analyzing flutter test data using non-linear damped sine curve fitting. Many specific details of certain embodiments of the invention are set forth in the following description and in FIGS. 1–5 to provide a thorough understanding of such embodiments. One skilled in the art, however, will understand that the present invention may have additional embodiments, or that the present invention may be practiced without several of the details described in the following description.

As described more fully below, analyzing flutter test data in accordance with embodiments of the present invention include applying a fitting equation that includes one or more damped sine waves to the test data. The fitting equation may be applied to the data from one transducer or multiple test transducers. In the event that multiple transducers are used, the noise in the test data may be averaged out to achieve a result that is more consistent with the data across all transducers deemed to have provided valid data. The methods in accordance with the present invention may advantageously provide improved representation of flutter test data, and may provide results that are more objective and consistent than may generally be obtained using prior art analysis methods.

More specifically, embodiments of the present invention may apply a non-linear curve fit that includes a plurality of damped sine waves to the flutter time history test data from a flutter dwell test. As is known, a dwell test is a test that excites the structural modes and then ceases the excitation to allow the structural responses to die out. The decay of the vibrations produces a set of flutter time history test data that can be modeled as a series of damped sine waves. This may be accomplished via a non-linear optimization algorithm. A criterion may be provided to determine the number of sine waves to use in any given optimization, as described more fully below.

Furthermore, embodiments of the present invention may analyze the flutter time history test data provided by a plurality of transducers (or sensors) to determine which transducers have useful data, and may disregard the data from insignificant or problematic transducers. The frequency and damping characteristics for all measurable structural modes may then be determined from the test data for the remaining useful transducers. Finally, a single set of frequency and damping characteristics that best matches all of the reliable test data may be provided.

Embodiments of the present invention may perform an individual fit of the test data set from each transducer to determine the level of noise in each test data set. Transducers which contain unacceptably high levels of noise may be disregarded. A fit may then be performed on all remaining useful test data sets with first one damped sine wave, and then successively, with additional damped sine waves. In one embodiment, a criterion to determine the proper number of damped sine waves to use may be based on the magnitude of the time history response for each sine wave compared to the total transducer response. Alternately, the criterion may also be based on a comparison of the magnitude of the time history response for each sine wave with the fit error. Ultimately, embodiments of the present invention may provide the frequency and damping values for each of the damped sine waves that are included in the final multiple-transducer fit.

FIG. 1 is a flowchart of a method 100 of analyzing a flutter time history data set 102 according to an embodiment of the present invention. A plurality of data points are read or recorded at a block 104. In one embodiment, each data point represents an amplitude versus a test time. The plurality of data points may represent test data acquired using a single sensor or transducer, or alternately, may represent data acquired using multiple sensors or transducers, as described more fully below. Next, a non-linear zero sine fit is applied to the data set 102 at block 104. In block 104, a straight line is fit through the data to determine any non-oscillatory bias in the data. Next, in decision block 106, a determination is made whether the curve-fitting process is complete. The fit process may be complete when one of the damped sine waves in the fit is unstable. Typically, all of the sine waves in the fit should be stable. The amplitude of each sine wave should be a significant portion of the total. In a preferred embodiment, the amplitude of each sine wave is larger than the fit error. If the method 100 is not complete, a fit error is determined, and a Fast-Fourier Transform (FFT) function is applied to the fit error at block 108. Then, a next damped sine mode is estimated from the FFT function at a block 110. More specifically, the frequency and phase of the next damped sine wave may be taken from the largest peak in the FFT. In one embodiment, the half-power method may be used to estimate the damping, and the amplitude may be initially set to zero. Using zero for the initial value for the amplitude may help to ensure that the fit will not be degraded with the addition of the next sine wave.

With continued reference to FIG. 1, the number of damped sine modes in the curve fit is incremented at a block 112. A non-linear "N" damped sine fit is applied to the test data set 102 at a block 114. It is during the non-linear "N" damped sine fitting procedure that the frequency and damping characteristics for all measurable structural modes are determined from the test data.

In one embodiment, applying the non-linear "N" damped sine curve fit to the flutter time history data set 102 (block 114) includes applying a curve fit to the data in accordance with the following Equation 1:

$$Y_j(t) = C_j + \sum_{i=1}^{N} e^{-D_i t} A_{ij} \sin(W_i t + \Phi_{ij}) \quad (1)$$

where
  j = response (gauge) index
  i = damped sine wave (mode) index
  t = time, seconds
  $Y_j$ = fit of the "$j^{th}$" response
  $C_j$ = constant term in the fit of the "$j^{th}$" response
  N = number of damped sine waves in the fit
  $D_i$ = damping term for the "$i^{th}$" sine
  $A_{ij}$ = amplitude term for the "$i^{th}$" sine in the fit the "$j^{th}$" response
  $W_i$ = frequency (rad/sec) term for the "$i^{th}$" sine
  $\Phi_{ij}$ = phase term for the , "$i^{th}$" sine in the fit the "$j^{th}$" response.

The critical damping ratio term $\zeta_i$ may be computed from the damping term $D_i$ and the frequency term $W_i$ according to the following Equation 2:

$$\zeta_i = D_i / \sqrt{D_i^2 + W_i^2} \quad (2)$$

The equivalent structural damping commonly used by flutter analysts can then be approximated as $g_i = 2\zeta_i$.

When multiple flutter time history data sets (or multiple responses) are fit simultaneously, the fit process may scale the error data to evenly weight the fit for each response. Each of the multiple responses has a fit equation and the difference between that fit equation and the response data is the error. The fit process minimizes the sum of the square of this error at each time point across all responses. This may be particularly important when a mix of different sensor types, such as a mix of accelerometers and strain gauges, are being fit simultaneously because the data range of response ($Rng_j$) may vary greatly (e.g. by orders of magnitude) from one sensor to another This would result in gauges with the larger response range $Rng_j$ dominating the fit results. Dividing the error data for each response by the range $Rng_j$ of that response scales the error data so that given percent error for each response in the fit are treated equally by the optimization.

Figure 2:
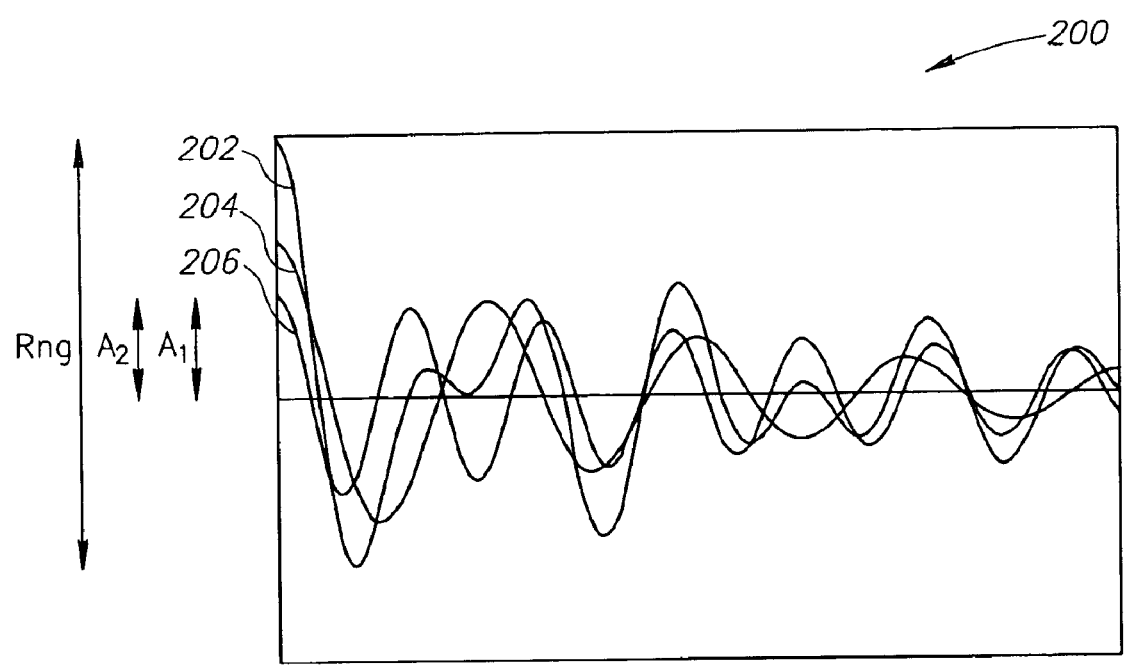
FIG. 2 is a graph showing three representative damped sine curve fit modes created using a damped sine curve fit equation in accordance with an embodiment of the present invention.

FIG. 2 is a graph 200 showing three representative damped sine curve fit modes 202, 204, and 206 created using the damped sine curve fit Equation (1). When an amplitude of a particular mode is small relative to other modes in the fit, changes in frequency and damping for that mode have less affect on the resulting fit. This may be particularly true when the data is noisy and contains significant random excitation.

In one particular embodiment, during the damped sine curve-fitting process (block 114 of FIG. 1), the method 100 may assess the significance of each $i^{th}$ mode in the damped sine curve fit using an amplitude factor $AMPFAC_i$ in accordance with the following Equation 3:

$$AMPFAC_i = \text{Max\_all}\_j((2 \cdot A_{ij}/Rng_j) \cdot 100) \qquad (3)$$

The amplitude factor $AMPFAC_i$ shown in Equation 3 may be used as a measure of the contribution of a given mode to a given response. Similarly, a given mode has an amplitude factor for each response, in accordance with the following Equation 4:

$$AMPFAC_{ij} = ((2 \cdot A_{ij}/Rng_j) \cdot 100) \qquad (4)$$

The maximum of the amplitude factor $AMPFAC_{ij}$ over all responses (j) as shown in Equation 3 is used to determine the reliability of a given mode (i). In other words, the value of the amplitude factor $AMPFAC_i$ may be examined to assess the significance of $i^{th}$ mode in the fit. If a mode (i) has a large amplitude factor $AMPFAC_{ij}$ (Equation 4) for one of several responses 0) in the fit, then that mode is considered reliable, as described more fully below. In physical terms, this means that if a particular mode dominates the response of any of the multiple responses, then it is considered reliable.

As further shown in FIG. 1, after performing the damped sine curve fit at block 114, the method 100 then returns to the determination block 106 to determine whether the process 100 is complete. If not, blocks 108 through 114 are repeated until the process 100 is determined to be completed, and the frequency and damping characteristics for a number of non-linear "N" damped sine fitting procedures have been determined. The results may then be output in block 116, thereby providing the frequency and damping characteristics from the non-linear "N" damped sine fitting procedures for analysis and selection, and the method 100 may continue (or terminate).

In one embodiment, two criteria may be used to determine whether a mode is reliable. First, when a mode is a relatively large component of at least one of the responses, then that mode may be considered reliable. And second, if the contribution of a mode for each of the responses is as small as the average fit error, it may be considered unreliable.

Figure 3:
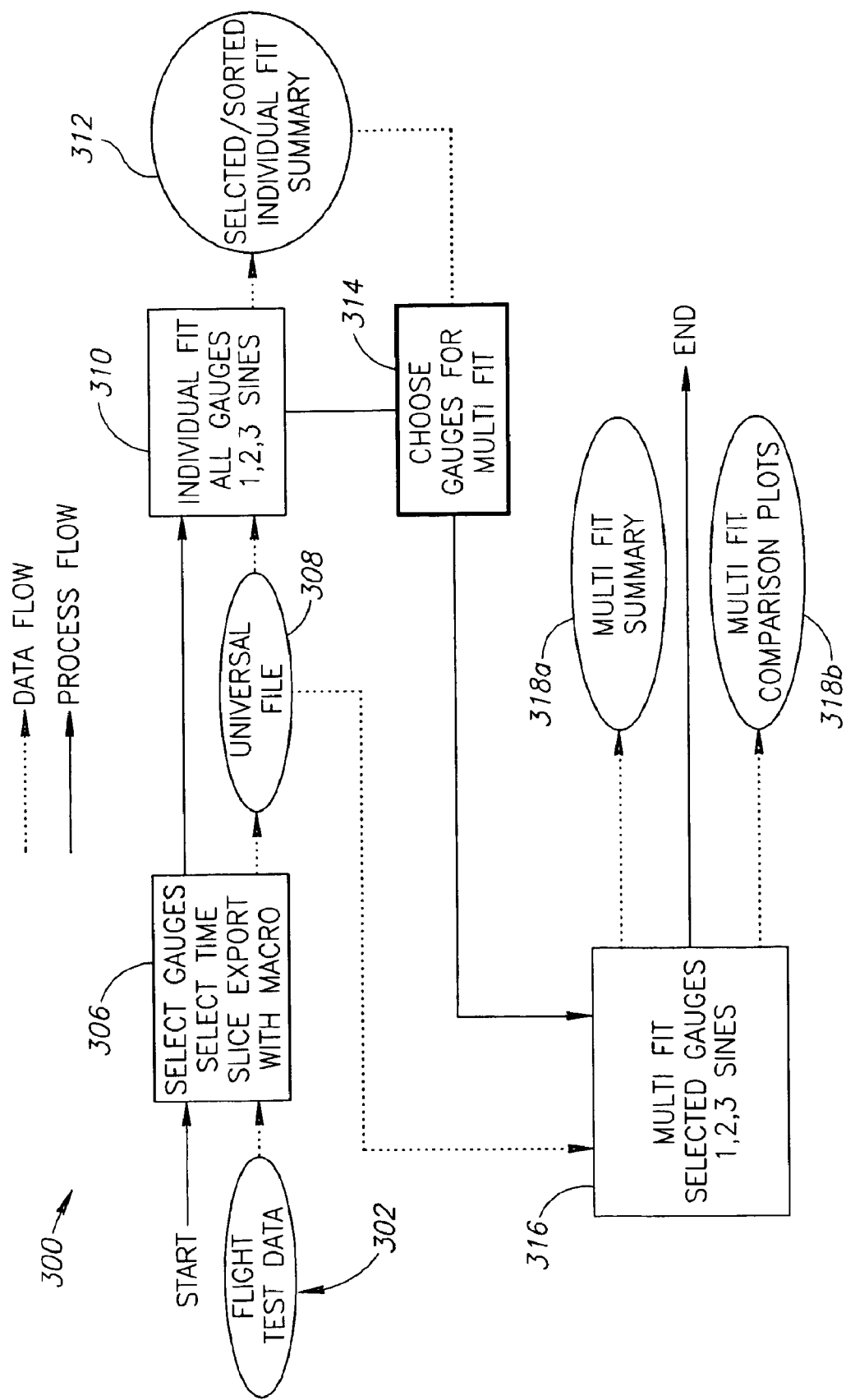
FIG. 3 is a flowchart showing a process for analyzing a plurality of flutter time history data sets from a plurality of test sensors in accordance with another embodiment of the present invention.

As previously mentioned, the process 100 described above for curve-fitting the flutter time history data set 102 may be employed to analyze multiple data sets provided by multiple sensors and transducers. For example, FIG. 3 is a flowchart showing a process 300 for analyzing a plurality of flutter time history data sets 302 from a plurality of test sensors 304 (not shown) in accordance with another embodiment of the present invention. At a block 306, a selection of some (or all) of the data sets 302 is performed for the analysis. The selection at block 306 may also include selecting a portion of time of the time history data sets 302. These selections may be performed manually by an operator, such as an engineer, viewing the time history data sets 302, or may be performed in any automated or semi-automated manner. The selections may include a subset of the available data sets, or the entirety of the available data sets. The results of these selections may be output to a universal data set 308 for further processing. Next, an individual damped sine curve-fitting is performed at a block 310 on all of the individual data sets 302 or data set portions contained in the universal data set 308 using a desired number of damped sine modes (e.g. i=1, 2, 3, etc.).

In a particular embodiment, the individual damped sine curve-fitting performed at block 310 is accomplished in accordance with the process 100 described above with reference to FIG. 1. The damping and frequency results of the individual curve-fitting from block 310 may then be stored in an individual fit summary file 312 for further access and analysis. The block 310 may be used to assess whether the data from a given transducer can be modeled as a series of damped sine waves.

If desired, a gauge selection may be performed at a block 314 in which the actual data sets for performing a multi-fit process are selected from the individual fit summary file 312. The gauge selection may be based on several factors, including how well the data can be modeled as a series of damped sine waves, and may also be based on the analyst's knowledge of the particular flutter mechanism (i.e. what type of motion and locations will likely contain the modes of interest). Next, in a block 316, a multi-fit process is performed for the selected gauges on the selected data sets stored in the universal data set file 308. At the block 316, the process 100 shown in FIG. 1 may be applied to all of the selected gauges and selected data sets. During the fitting process performed at the block 316, the amplitude factors $AMPFAC_i$ are computed using Equation (3) above, and these data are tabulated and output into one or more output files 318 along with the frequency and damping data into summary and comparison plot files. An engineer or other analyst may then examine these data and determine which fit data should be used, including which sets of frequency and damping data are to be relied upon. This examination may include analysis of the amplitude factor $AMPFAC_i$ values to determine which modes are "reliable" and which are not. In one embodiment, it may be desirable to utilize as many reliable modes as possible to fit the response data. In one particular embodiment, given by way of non-limiting example, an $AMPFAC_i$ value greater than 40 is considered a most reliable mode, an $AMPFAC_i$ value between 10 and 40, inclusive, is considered to be a moderately reliable mode, an $AMPFAC_i$ value less than 10 is considered to be a lesser reliable mode, and an $AMPFAC_i$ value less than or approximately equal to an average error value, or a square root of the average error value squared, (both typically having a value of 10 or less) is considered to be unreliable, and the mode is discarded. Alternately, in another embodiment, an $AMPFAC_i$ value greater than 30% and greater than 2*ESQR as the lower limit for acceptable modes may be used. The engineer or analyst may then review and analyze the fit data for various fits of "N" different sine waves to determine which data are the most accurate and reliable, and thus, may determine the number of sine waves to include in the curve fit.

In the embodiment shown in FIG. 3, the scaling of the error data is inherent in block 114 of process 100. For each iteration in the non-linear fit, the difference between the fit equation and the data may be computed (i.e. error). The error (for each response) may be recast as a percentage by dividing the error by the range of that response data. The optimization function for the non-linear fit may then be the sum of the squares of all of the above referenced errors.

Figure 4:
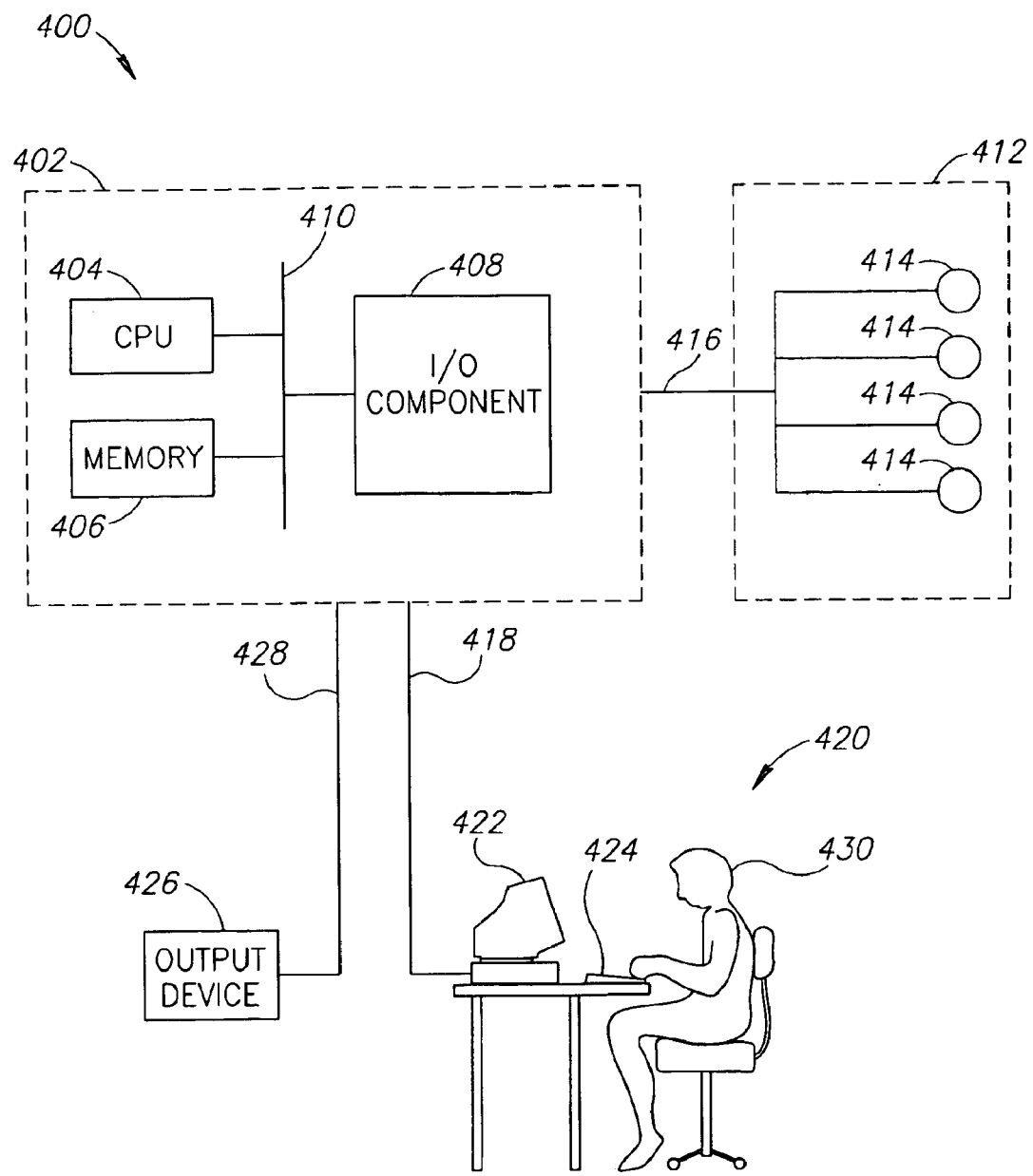
FIG. 4 is a system for analyzing flutter test data in accordance with an embodiment of the present invention.

FIG. 4 is a system 400 for analyzing flutter test data in accordance with an embodiment of the present invention. Unless otherwise specified below, the components of the system 400 are of generally-known construction, and will not be described in detail. For the sake of brevity, only significant details and aspects of the system 400 will be described. As shown in FIG. 4, in this embodiment, the system 400 includes a computer 402 having a central processing unit (CPU) 404 and a memory component 406. The memory component 406 may include one or more memory modules, such as Random Access Memory (RAM) modules, Read Only Memory (ROM) modules, Dynamic Random Access Memory (DRAM) modules, and any other suitable memory modules. The computer 402 also includes an input/output (I/O) component 408 that may include a variety of known I/O devices, including network connections, video and graphics cards, disk drives or other computer-readable media drives, displays, or any other suitable I/O modules. A data bus 410 operatively couples the CPU 404, memory component 406, and the I/O component 408.

The system 400 embodiment shown in FIG. 4 further includes a data acquisition component 412 operatively coupled to the computer 402. In this embodiment, the data acquisition component 412 includes a plurality of transducers 414 that may be arrayed on a test article for the acquisition of flutter test data. The data acquisition component 412 is operatively coupled to the computer 402 via a first communication link 416.

As further shown in FIG. 4, the system 400 further includes a control component 420 having a monitor 422 and a command input device 424 (e.g. a keyboard, an audio-visual input device, etc.). A second communication link 418 operatively couples the control component 420 to the computer 402. The system 400 also includes an auxiliary output device 426 coupled to the computer 402 by a third communication link 428. The auxiliary output device 426 may include a printer, a compact disk (CD) burner, a storage device, a communication port, or any other desired output device.

In one aspect, a machine-readable medium 440 may be used to store a set of machine-readable instructions (e.g. a computer program) into the computer 402, wherein the machine-readable instructions embody a method of analyzing flutter test data in accordance with the teachings of the present invention. The machine-readable medium 440 may be any type of medium which can store data that is readable by the computer 402, including, for example, a floppy disk, CD ROM, optical storage disk, magnetic tape, flash memory card, digital video disk, RAM, ROM, or any other suitable storage medium. The machine-readable medium 440, or the instructions stored thereon, may be temporarily or permanently installed in any desired component of the system 400, including, for example, the I/O component 408, the memory component 406, and the auxiliary output device 426. Alternately, the machine-readable instructions may be implemented directly into one or more components of the computer 402, without the assistance of the machine-readable medium 440.

In operation, the computer 402 may be configured to perform one or more of the aspects of the methods of analyzing flutter test data described above. For example, an operator 430 may input a command through the command input device 424 to cause the data acquisition component 412 to obtain one or more test data sets 102. The test data sets 102 may then be communicated from the data acquisition component 412 to the computer 402. The computer 402 may be configured to perform the methods of analyzing the test data sets 102. For example, a set of software instructions may be stored in the computer 402 (e.g. in the memory component 406) that causes the test data sets 102 to be read into the memory component 406 and processed using the CPU 404 in accordance with one or more of the methods 100, 300 described above with respect to FIGS. 1–3. Alternately, one or more aspects of the analysis methods 100, 300 may be implemented in the computer 402 using any suitable programmable or semi-programmable hardware components (e.g EPROM components).

Results 432 (e.g the multi-fit summary 318*a* and multi-fit comparison plots 318*b* of FIG. 3) of the analysis methods 100, 300 may be transmitted via the data bus 410 to the I/O component 408. The results 432 may also be transmitted to the control component 420 and to the auxiliary output device 426 via the second and third communications links 418, 428. The operator 430 may view the results 432 of the analysis methods 100, 300 on the control monitor 422, and may take appropriate action, including revising analysis parameters and inputs, and continuing or repeating the analysis methods 100, 300 with different test data as desired.

Figure 5:
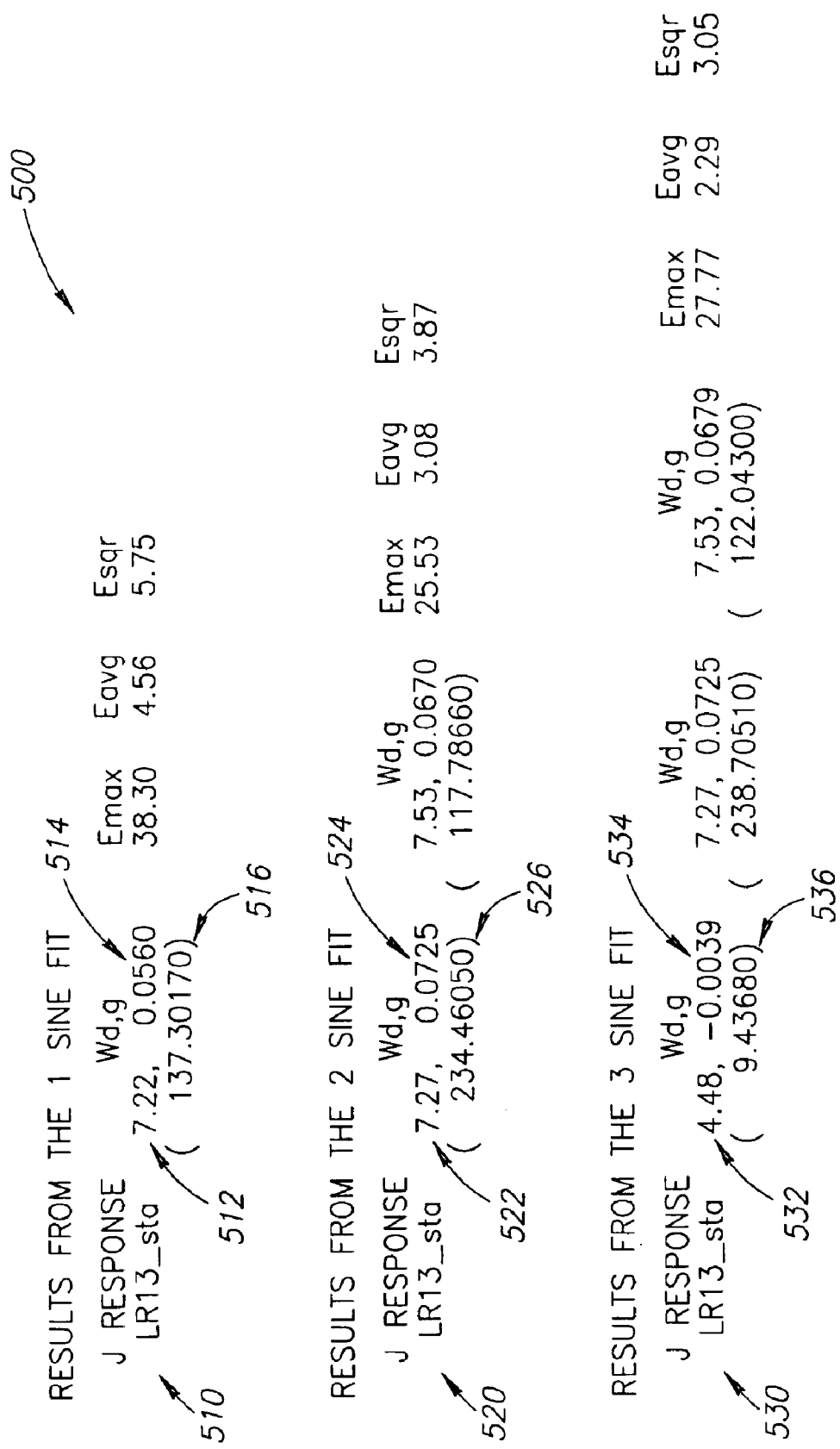
FIG. 5 is a table showing representative analysis results of the system of FIG. 4 in accordance with an embodiment of the present invention.

FIG. 5 is a table 500 showing a series of analysis results of the system 400 of FIG. 4 in accordance with an embodiment of the present invention. Specifically, the table 500 shows the results of the method 300 of curve-fitting "N" damped sine waves to a plurality of test data sets acquired using a plurality of test sensors during a flight test of an aircraft. In this embodiment, the table 500 includes results for a single-mode sine wave fit 510, a two-mode sine wave fit 520, and a three-mode sine wave fit 530. Each of the three sets of analysis results 510, 520, 530 includes a frequency value 512, 522, 532, a damping value 514, 524, 534, and an $AMPFAC_i$ value 516, 526, 536, respectively. For the representative analysis results 510, 520, 530, an operator may determine that the two-mode sine wave fit results 520 are selected as the best approximation to the test data. Referring to FIG. 5, the one sine fit 510 may be acceptable, however, the two sine fit 520 may be preferred since both modes have a relatively large $AMPFAC_i$ 526 and "117.78660". Both of these values are much higher than the average scaled error "3.08". The three sine fit may be rejected for two reasons. First, the $AMPFAC_i$ value 536 is too low (less than 10%) even though the $AMPFAC_i$ for the other sines are acceptable ("238.70510" and "122.04300"). Second, the damping 534 is unstable and the system was stable when the data were taken.

Analyzing flutter data in accordance with embodiments of the present invention may provide significantly improved capabilities to characterize, interpret, and reduce flutter test data. As described above, the data from multiple test transducers may be averaged to reduce or eliminate the noise from the data, thereby providing an improved result which may be more consistent with the data across all transducers that have provided valid test data. Thus, embodiments of the present invention may provide a result that is more representative of the body of valid data. The embodiments of the present invention may also reduce or eliminate the subjectivity associated with the engineer's individual data selections and curve fitting decisions from the analysis, thereby providing analytical results that are more consistent, reliable, and reproducible, compared with prior art methods.

While specific embodiments of the invention have been illustrated and described herein, as noted above, many changes can be made without departing from the spirit and scope of the invention. Accordingly, the scope of the invention is not limited by the disclosure of the specific embodiments set forth above. Instead, the invention should be determined entirely by reference to the claims that follow.

What is claimed is:

1. A method of analyzing flutter test data, the method comprising:

reading a plurality of data sets, each data set including a plurality of data points recorded by a corresponding measurement device, each data point representing an amplitude versus a test time;

determining a number "N" of damped sine waves to fit to each of the data sets of data points;

simultaneously fitting the number "N" of damped sine waves to the plurality of data sets; and determining a set of modal frequency and damping values based on the simultaneous fitting of all of the data sets.

2. The method of claim 1, wherein simultaneously fitting the number "N" of damped sine waves to the plurality of data sets includes simultaneously fitting the number "N" of damped sine waves to the plurality of data sets using a non-linear "N" damped sine wave fitting algorithm.

3. The method of claim 1, wherein determining a number "N" of damped sine waves to fit to each of the data sets includes comparing a magnitude of a time history response for a sine wave mode to a total transducer response.

4. The method of claim 1, wherein determining a number "N" of damped sine waves to fit to each of the data sets includes:

determining a fit error between a candidate sine wave mode and the plurality of data points; and comparing a magnitude of a time history response for the candidate sine wave mode to the fit error.

5. The method of claim 1, wherein fitting the number "N" of damped sine waves to each of the data sets includes:

determining a fit error between a sine wave mode and the plurality of data points; and applying a Fast-Fourier Transform function to the fit error to estimate a next sine wave mode to be included in the non-linear "N" damped sine wave fitting algorithm.

6. The method of claim 1, wherein fitting the number "N" of damped sine waves to each of the data sets includes:

assessing a significance of a sine wave mode; and determining whether to include the sine wave mode in the non-linear "N" damped sine wave fitting algorithm based on the assessment.

7. The method of claim 6, wherein assessing a significance of a sine wave mode includes determining an amplitude factor for the sine wave mode.

8. The method of claim 6, wherein assessing a significance of a sine wave mode includes determining an amplitude factor for the sine wave mode, the amplitude factor being a function of a ratio of an amplitude over an amplitude range of the sine wave mode.

9. The method of claim 8, wherein assessing a significance of a sine wave mode further includes determining the sine wave mode to be insignificant when the amplitude factor is less than or approximately equal to an average error value.

10. The method of claim 8, wherein assessing a significance of a sine wave mode further includes determining the sine wave mode to be insignificant when the amplitude factor is less than or approximately equal to a square root of an average error value squared.

11. The method of claim 1, wherein reading a plurality of data sets includes selecting the plurality of data sets based on whether the data set can be modeled as a series of damned sine waves.

12. A method of analyzing flutter test data, the method comprising:

reading a plurality of sets of data points obtained from a plurality of test sensors, each set of data points representing an amplitude versus a test time for a corresponding one of the plurality of test sensors;

determining which of the plurality of sets of data points are useful sets of data points;

for the useful sets of data points, performing a curve fit to each of the data sets that includes determining a number "N" of damped sine waves to fit to the useful sets of data points;

simultaneously fitting the number "N" of damped sine waves to the useful sets of data sets; and determining a set of modal frequency and damping values based on the simultaneous fitting of the useful data sets.

13. The method of claim 12, wherein simultaneously fitting the number "N" of damped sine waves to the plurality of data sets includes simultaneously fitting the number "N" of damped sine waves to the plurality of data sets using a non-linear "N" damped sine wave fitting algorithm.

14. The method of claim 12, wherein simultaneously determining a number "N" of damped sine waves to fit to the useful sets of data sets includes simultaneously comparing a magnitude of a time history response for a sine wave mode to a total transducer response.

15. The method of claim 12, wherein simultaneously determining a number "N" of damped sine waves to fit to the useful sets of data sets includes:

determining a fit error between a candidate sine wave mode and the useful sets of data points; and comparing a magnitude of a time history response for the candidate sine wave mode to the fit error.

16. The method of claim 12, wherein simultaneously fitting the number "N" of damped sine waves to the useful sets of data sets includes:

determining a fit error between a sine wave mode and the useful sets of data points; and applying a Fast-Fourier Transform function to the fit error to estimate a next sine wave mode to be included in the non-linear "N" damped sine wave fitting algorithm.

17. The method of claim 12, wherein simultaneously fitting the number "N" of damped sine waves to the useful sets of data sets includes:

assessing a significance of a sine wave mode; and determining whether to include the sine wave mode in the non-linear "N" damped sine wave fitting algorithm based on the assessment.

18. The method of claim 17, wherein assessing a significance of a sine wave mode includes determining an amplitude factor for the sine wave mode.

19. The method of claim 17, wherein assessing a significance of a sine wave mode includes determining an amplitude factor for the sine wave mode, the amplitude factor being a function of a ratio of an amplitude over an amplitude range of the sine wave mode.

20. The method of claim 19, wherein assessing a significance of a sine wave mode further includes determining the sine wave mode to be insignificant when the amplitude factor is less than or approximately equal to an average error value.

21. The method of claim 19, wherein assessing a significance of a sine wave mode further includes determining the sine wave mode to be insignificant when the amplitude factor is less than or approximately equal to a square root of an average error value squared.

22. The method of claim 12, wherein simultaneously fitting the number "N" of damped sine waves to the useful sets of data sets includes:

determining an error value for each useful data set; and scaling the useful data set to evenly weight the fit for each useful data set.

23. A machine-readable medium having instructions stored thereon for execution by a processor to perform a method of of analyzing flutter test data, the method comprising:

reading a plurality of data sets, each data set including a plurality of data points, each data point representing an amplitude versus a test time;

determining a number "N" of damped sine waves to fit to the plurality of data sets;

simultaneously fitting the number "N" of damped sine waves to the plurality of data sets; and determining a set of modal frequency and damping values based on all of the data sets.

24. The medium of claim 23, wherein simultaneously fitting the number "N" of damped sine waves to the plurality of data sets includes simultaneously fitting the number "N" of damped sine waves to the plurality of data sets using a non-linear "N" damped sine wave fitting algorithm.

25. The medium of claim 23, wherein simultaneously determining a number "N" of damped sine waves to fit to the plurality of data sets includes comparing a magnitude of a time history response for a sine wave mode to a total transducer response.

26. The medium of claim 23, wherein simultaneously determining a number "N" of damped sine waves to fit to the plurality of data sets includes:

determining a fit error between a candidate sine wave mode and the plurality of data sets; and comparing a magnitude of a time history response for the candidate sine wave mode to the fit error.

27. The medium of claim 23, wherein simultaneously fitting the number "N" of damped sine waves to the plurality of data sets includes:

determining a fit error between a sine wave mode and the plurality of data points; and applying a Fast-Fourier Transform function to the fit error to estimate a next sine wave mode to be included in the non-linear "N" damped sine wave fitting algorithm.

28. The medium of claim 23, wherein simultaneously fitting the number "N" of damped sine waves to the plurality of data sets includes:

assessing a significance of a sine wave mode; and determining whether to include the sine wave mode in the non-linear "N" damped sine wave fitting algorithm based on the assessment.

29. The medium of claim 28, wherein assessing a significance of a sine wave mode includes determining an amplitude factor for the sine wave mode.

30. The medium of claim 28, wherein assessing a significance of a sine wave mode includes determining an amplitude factor for the sine wave mode, the amplitude factor being a function of a ratio of an amplitude over an amplitude range of the sine wave mode.

31. The medium of claim 30, wherein assessing a significance of a sine wave mode further includes determining the sine wave mode to be insignificant when the amplitude factor is less than or approximately equal to an average error value.

32. The medium of claim 30, wherein assessing a significance of a sine wave mode further includes determining the sine wave mode to be insignificant when the amplitude factor is less than or approximately equal to a square root of an average error value squared.

33. The medium of claim 23, wherein reading a plurality of data sets, each data set including a plurality of data points includes:

reading a first plurality of data points corresponding to a first test sensor; and reading a second plurality of data points corresponding to a second test sensor.

34. A system for analyzing flutter test data, comprising:

a control component;

a computer operatively coupled to the control component and adapted to receive a plurality of data sets, each data set including a plurality of test data points, the computer further being adapted to perform a method of analyzing the plurality of test data points, the method including:

determining a number "N" of damped sine waves to fit to each of the data sets;

simultaneously fitting the number "N" of damped sine waves to the plurality of data sets; and determining a set of modal frequency and damping values based on all of the data sets.

35. The system of claim 34, wherein simultaneously fitting the number "N" of damped sine waves to the plurality of data sets includes fitting the number "N" of damped sine waves to the plurality of data sets using a non-linear "N" damped sine wave fitting algorithm.

36. The system of claim 34, wherein simultaneously fitting the number "N" of damped sine waves to the plurality of data sets includes:, determining a fit error between a sine wave mode and the plurality of data points; and applying a Fast-Fourier Transform function to the fit error to estimate a next sine wave mode to be included in the non-linear "N" damped sine wave fitting algorithm.

37. The system of claim 34, wherein simultaneously fitting the number "N" of damped sine waves to the plurality of data sets includes:

assessing a significance of a sine wave mode; and determining whether to include the sine wave mode in the non-linear "N" damped sine wave fitting algorithm based on the assessment.

38. The system of claim 34, wherein the plurality of test data sets include a first plurality of test data points from a first test sensor, and wherein the computer module is further adapted to receive a second plurality of test data points from a second test sensor.

39. The system of claim 34, wherein the computer includes a central processing unit and a memory component.

40. The system of claim 34, wherein the computer includes an I/O component.

41. The system of claim 34, further comprising a data aequisition component operatively coupled to at least one of the computer and the control component.

42. The system of claim 41, wherein the data acquisition component includes a plurality of data acquisition sensors.

* * * * *

UNITED STATES PATENT AND TRADEMARK OFFICE
CERTIFICATE OF CORRECTION

PATENT NO. : 6,947,858 B2 Page 1 of 1
DATED : September 20, 2005
INVENTOR(S) : Goodman et al.

It is certified that error appears in the above-identified patent and that said Letters Patent is hereby corrected as shown below:

Column 9,
Line 61, replace "damned sine waves" to -- damped sine waves --.

Signed and Sealed this

Seventh Day of February, 2006

JON W. DUDAS
*Director of the United States Patent and Trademark Office*